W. A. GEIGER.
HAND BRAKE.
APPLICATION FILED JUNE 12, 1919.
1,361,455. Patented Dec. 7, 1920.
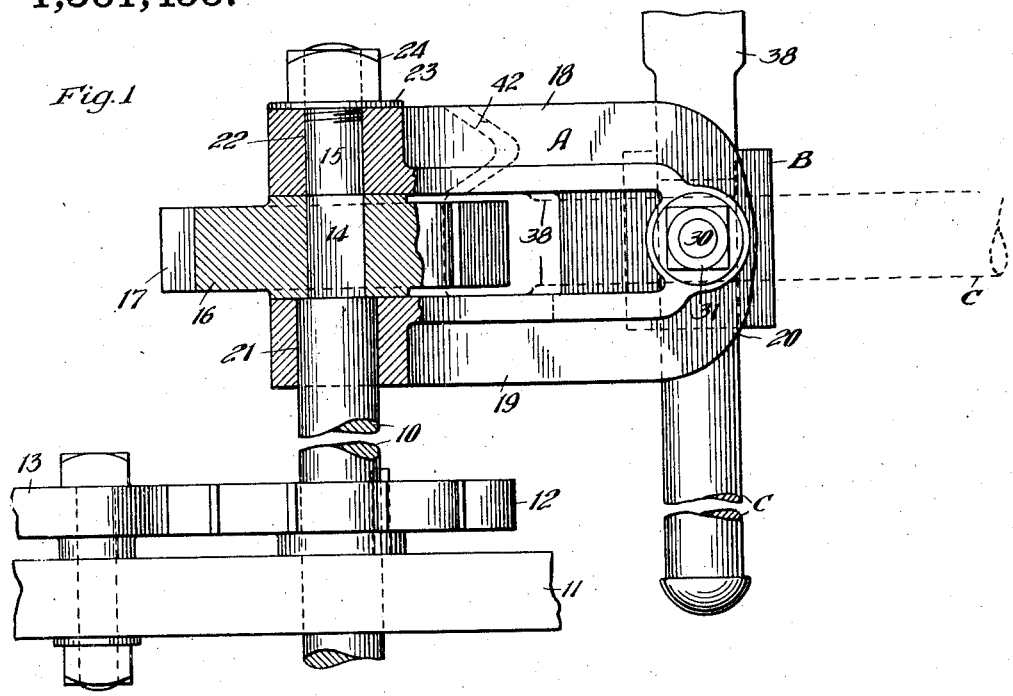
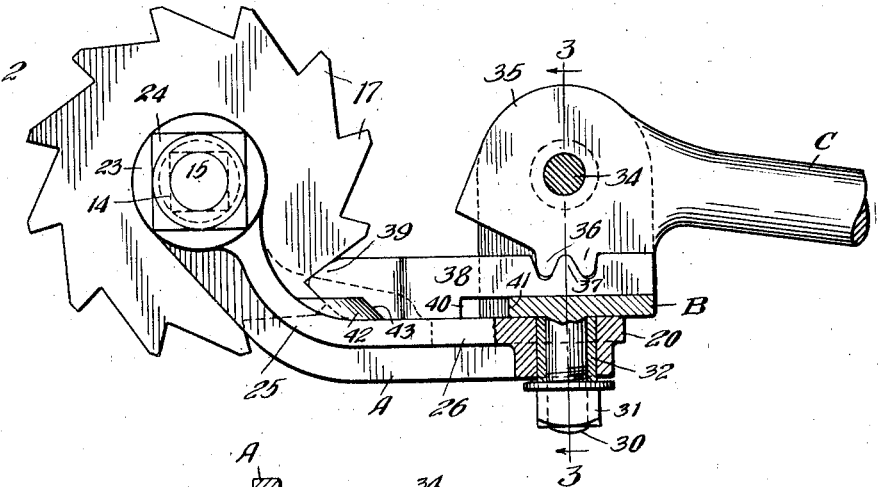
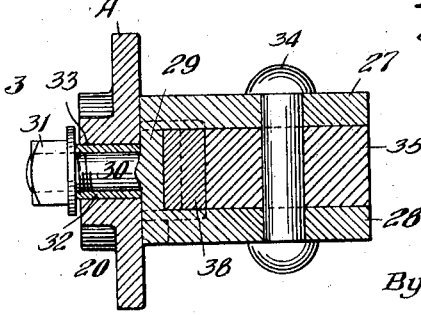
Witnesses
Charles E. Dath
Inventor
William A. Geiger
By Geo. J. Haight
Atty.

UNITED STATES PATENT OFFICE.

WILLIAM A. GEIGER, OF CHICAGO, ILLINOIS, ASSIGNOR TO WILLIAM H. MINER, OF CHAZY, NEW YORK.

HAND-BRAKE.

1,361,455.      Specification of Letters Patent.      Patented Dec. 7, 1920.

Application filed June 12, 1919. Serial No. 303,625.

*To all whom it may concern:*

Be it known that I, WILLIAM A. GEIGER, a citizen of the United States, residing at Chicago, in the county of Cook and State of Illinois, have invented a certain new and useful Improvement in Hand-Brakes, of which the following is a full, clear, concise, and exact description, reference being had to the accompanying drawings, forming a part of this specification.

This invention relates to improvements in hand brakes.

The object of the invention is to provide a simple and efficient, easily operable ratcheting brake, especially adapted for use as a hand brake for railway cars.

In the drawing forming a part of this specification, Figure 1 is a part elevational view, part vertical, sectional view of a hand brake of a railway car showing my improvements in connection therewith. Parts of the vertical brake staff are broken away in order to accommodate the view on the sheet. A part of the operating handle is also broken away for the same purpose. Fig. 2 is a top plan view of the construction shown in Fig. 1, a portion of the pivotal connection being shown in section to more clearly illustrate the construction. Fig. 3 is a vertical, sectional view, taken substantially on the line 3—3 of Fig. 2.

In said drawing, 10 denotes a vertical brake staff such as is common on railway freight cars. As customary, the same passes through the well known foot-board or step indicated at 11 where the brakeman stands while setting the brake. Just above the step 11, the staff 10 is provided with a ratchet wheel 12 with which coöperates a foot-controlled pivoted locking dog 13, said construction being old and well known.

At the upper end of the staff 10, the latter is provided with a squared section 14 of reduced size and above the latter with another cylindrical section 15, the diameter of which corresponds to the distance between the side walls of the squared section 14. Mounted on the squared section 14 of the staff is a ratchet wheel 16 having peripheral ratchet teeth 17. As will be evident, the ratchet wheel 16 will always rotate in unison with the staff.

Rotatably or oscillatably mounted on the staff 10 is a supporting member designated generally by the reference A. Said member A, as shown, is of substantially U-shape having an upper arm 18 and a lower arm 19 united by a curved connecting piece 20. The lower arm 19 is provided with a circular opening as indicated at 21 fitting the main portion of the staff 10 so that the latter forms a suitable bearing for the supporting member A. Similarly, the upper arm 18 of the member A is provided with a circular opening 22 journaled on the cylindrical section 15 of the staff. The member A and ratchet wheel 16 may be held in place by any suitable means such as the washer 23 and nut 24. As will be evident, the arms of the member A straddle the ratchet wheel 16. Furthermore, as shown most clearly by Fig. 2, the arms 18 and 19 of the member A do not extend on a true radius from the staff but have curved sections 25 therein and an outer straight section 26.

At the outer end of the member A is provided a U-shaped stirrup or fork designated generally by the reference B. The latter has upper and lower arms 27 and 28 connected by the vertical piece 29, the latter having a preferably integral stud 30 threaded at its outer end to receive a nut 31. The stud 30 passes through a bushing 32 disposed in a corresponding opening 33 of the member A. The bushing 33 is made slightly longer than the thickness of the member A providing the bearing therefor so that the nut 31 may be clamped tight against the bushing 32 without thereby making the pivotal connection frictionally tight for the fork B. From the foregoing, it will be evident that the member B is oscillatable on the member A about a horizontal axis.

Pivotally mounted between the arms 27 and 28 of the member B on a rivet 34 or other suitable member, is an operating handle or lever indicated by the reference C. The latter is provided at its pivoted end with an enlarged head 35, the head having two or more teeth 36 adapted to coöperate with corresponding rack teeth 37 on a slidable pawl 38. The latter is slidably mounted between the forks 27 and 28 of the member B, as clearly indicated by the Figs. 2 and 3. At its inner end, the pawl 38 is provided with a single tooth 39 adapted to engage and coöperate with the ratchet teeth 17. The pawl 38 and member B are formed with shoulders 40 and 41, respectively, adapted to limit the outward movement of the pawl 38 with respect to the member B when the operating handle C is swung in a counterclockwise direction as viewed in Fig. 2.

The full lines of Fig. 1 indicate the inoperative position of the operating handle and pawl, both of which are carried by the member B. As will be understood, the handle C falls to a depending vertical position under the influence of gravity when it is released by the brakeman, thus causing the member B to oscillate and carrying with it the pawl 38. In this condition, it is evident that when the brakeman kicks out the locking dog 13 after the brakes have been applied, the sudden release of the brake staff cannot carry with it any of the pawl winding mechanism, thus avoiding possibility of danger to the brakeman.

In moving the operating handle C and pawl associated therewith to an operative position, it is advisable to insure that the tooth 39 of the pawl 38 will not come down on top of the ratchet wheel 16. To this end, I provide on the upper arm 18 of the supporting member A a cam 42 and a corresponding cam face 43 on the adjacent portion of the pawl 38. As will be evident from an inspection of Figs. 1 and 2, the cam and cam face mentioned are so designed that as the pawl 38 swings from the vertical to a horizontal position, it will be projected outwardly so as to positively position the pawl tooth 39 beyond the periphery of the ratchet wheel as it swings downwardly. After the pawl 38 has passed the cam 42, it then can be projected into operative engagement with the ratchet teeth 17, this being done by swinging the handle C in a clockwise direction as viewed in Fig. 2.

The device comprises few parts; is applicable to vertical brake staffs of freight cars now in use by slightly modifying the upper ends of the latter; the actions of the pawl in its operative and inoperative positions are controlled entirely by the brakeman through the manipulation of the handle C; and all springs are entirely avoided.

Although the device herein shown and described is what I consider the preferred manner of carrying out the invention, the same is merely illustrative and I contemplate such changes and modifications as come within the scope of the claims appended hereto.

I claim:

1. In a hand brake for railway cars having a vertical brake staff, the combination with a ratchet wheel rotatable in unison with the staff, of supporting means oscillatable with respect to the staff, a pawl coöperable with said ratchet wheel and slidably mounted on said supporting means, an operating handle, coöperating teeth on said handle and pawl, and means providing a pivotal support for the pawl and handle adapting them to swing, under the influence of gravity, to an inoperative position.

2. In a hand brake for railway cars, the combination with a brake staff, having a ratchet wheel rotatable in unison therewith, of supporting means oscillatably mounted on said staff adjacent said ratchet wheel, a bracket pivotally mounted on said supporting means, a pawl slidably mounted on said bracket, and in one position of the latter, adapted to coöperate with said ratchet wheel, and an operating handle pivotally mounted on said bracket adapted to fall to an inoperative position under the influence of gravity and simultaneously actuate the pawl to an inoperative position.

3. In a hand brake for railway cars and the like, the combination with a vertical brake staff having a ratchet wheel rotatable in unison therewith, of supporting means oscillatably mounted on said staff adjacent said ratchet wheel, a member pivotally mounted on said supporting means to rotate about a horizontal axis, a pawl slidably mounted on said member, an operating handle movably mounted on said member, and coöperating devices on said supporting means and pawl adapted to positively properly position the latter with respect to the ratchet wheel as said member carrying the pawl swings about its pivot to an operative position.

4. In a brake of the character described, the combination with a vertically extending member to be rotated having a ratchet wheel rotatable in unison therewith, of supporting means oscillatably mounted on said member adjacent said ratchet wheel, a yoke pivotally mounted on said supporting means about a horizontal axis, a pawl slidably mounted on said yoke, an operating handle pivotally mounted on said yoke about an axis perpendicular to the axis of the latter, and coöperating engaging means on said handle and pawl adapted to move the latter into coöperative ratcheting engagement with the ratchet wheel when the handle is swung about its pivot in one direction.

5. In a hand brake for railway cars, the combination with a vertical brake staff having a ratchet wheel rotatable in unison therewith, of a supporting member oscillatably mounted on said staff adjacent said ratchet wheel, a U-shaped yoke pivotally mounted on said supporting member about a horizontal axis, a pawl slidably mounted on said yoke and adapted to coöperate with the teeth of said ratchet wheel, an operating handle pivotally mounted on said yoke, and coöperating teeth on said handle and pawl whereby the pawl is projected into operative engagement with the ratchet wheel and moved away from the latter when the handle is oscillated about its pivot, said handle and pawl being adapted for movement to an inoperative position under the influence of gravity.

In witness that I claim the foregoing I have hereunto subscribed my name this 16th day of May, 1919.

WILLIAM A. GEIGER.